Oct. 8, 1935.                H. S. MORTON                2,016,553
                 CONTROL WITH INTERCEPTOR FOR STOKERS
                 Filed Nov. 23, 1932        3 Sheets-Sheet 1
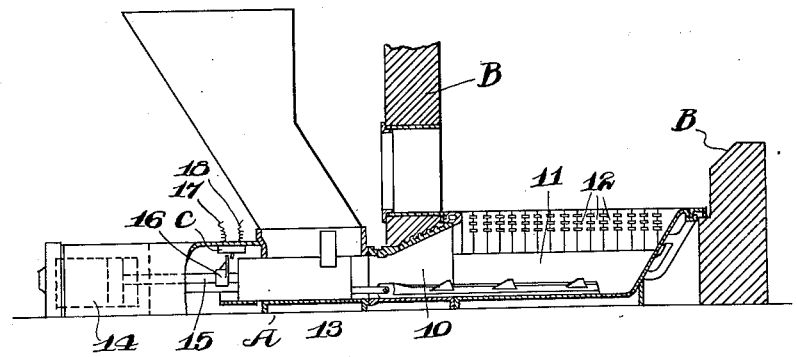
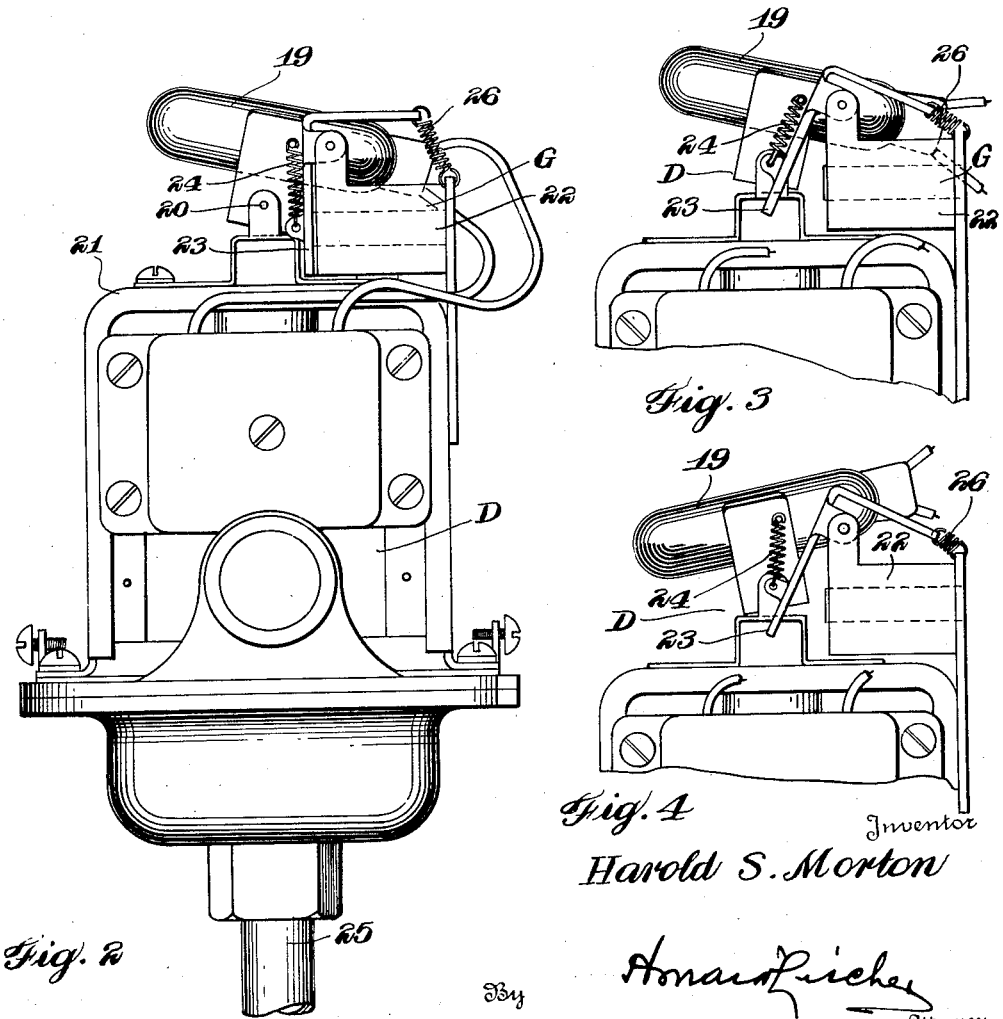
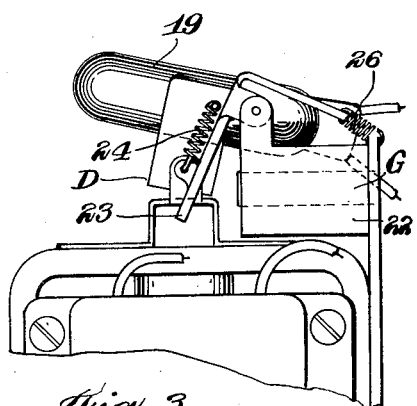
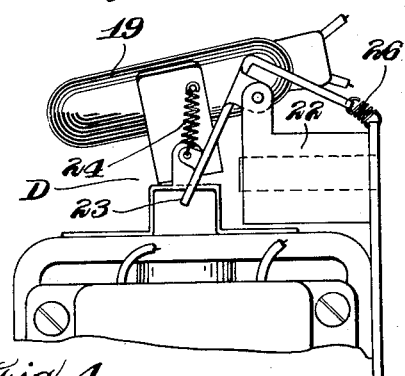
Inventor
Harold S. Morton

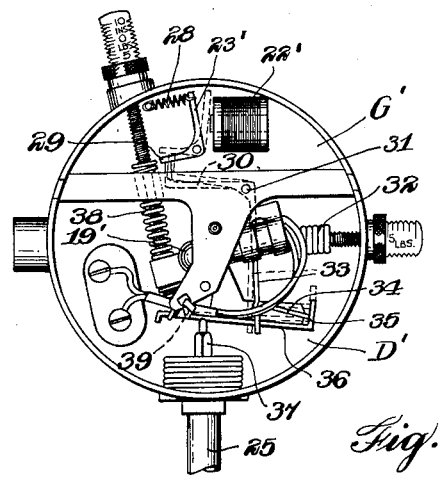
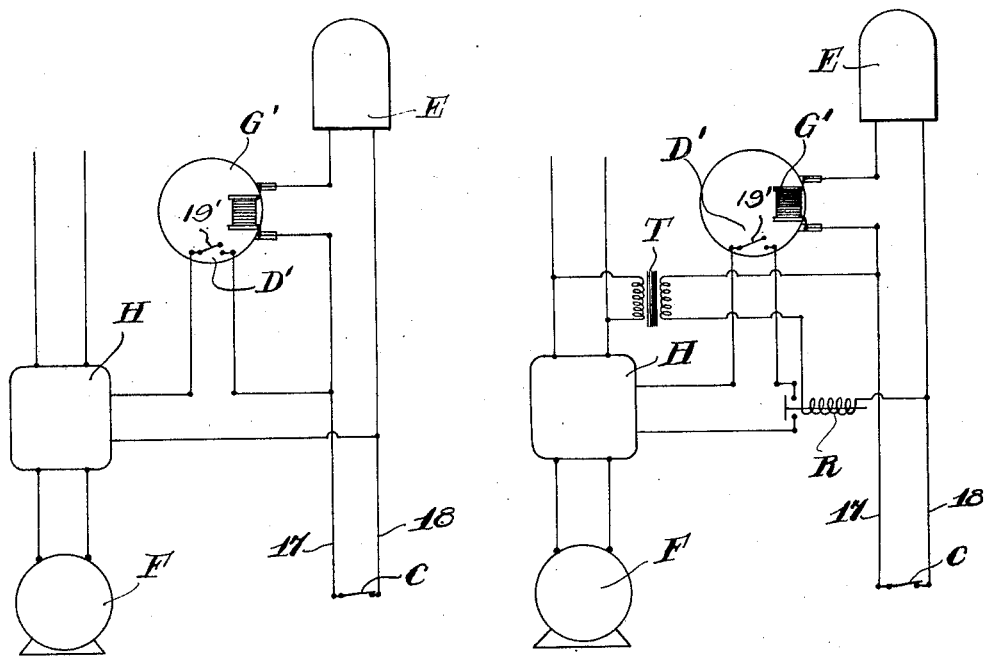

Inventor
Harold S. Morton

Patented Oct. 8, 1935

2,016,553

UNITED STATES PATENT OFFICE 2,016,553

CONTROL WITH INTERCEPTOR FOR STOKERS

Harold S. Morton, St. Paul, Minn., assignor to Stott Briquet Company, Inc., St. Paul, Minn., a corporation of Delaware Application November 23, 1932, Serial No. 643,996

4 Claims. (Cl. 236—15)

My invention relates to a control with interceptor means for stokers to cause the stoker to operate in a manner so that it will be always stopped in approximately the same position, closing the throat of the stoker and permitting it to be controlled by any of a number of different control means. These controls will be defined and each is associated with my interceptor means which brings the stoker to rest at the proper time, rather than permitting the controls associated with the stoker to stop it in any position at any moment.

It is important in the operation of a stoker to cause the same to be operated under a controlling means which is regulated to prevent the stoker from stopping when the ram or plunger is in the outer position while the fuel is loose in the throat and which may permit of a draft through the throat or even let the fire from the fuel bed creep back in the throat and toward the feeding hopper. My interceptor means as associated with various controlling electric circuits and devices, causes the control of the stopping of the stoker to be accurately and definitely accomplished at a particular time, overcoming the above difficulties and yet permitting the limit controls to function properly and without changing their operation to impair the protection or interfere with the utility thereof.

My interceptor means may be associated with a limit control such as a pressure control, aquastat, or hot air control, and is associated therewith in order to cause the stoker to stop only at a particular point in its cycle of operation and not at any point where it may happen to be, when the limit controls operate to stop the stoker.

A feature resides in providing electric circuit means or such other means as to form a limit control which is used to start and stop the stoker and having my interceptor means associated therewith so that when the limit control tries to open the circuit to the motor operating the stoker or to operate such means as to tend to stop the operation of the stoker, the stoker operating means will continue until it reaches a point at which it is desired to have it stopped. When the operating means of the stoker reaches this point, the limit control is permitted to act and the stoker is thus stopped at the desired point. When an electric circuit operating and limit control means is employed for the stoker with the "open circuit" type, the interceptor interferes with the action of the limit control except when the stoker ram switch opens. In the "closed circuit" type, the interceptor delays the limit control action while the circuit is closed, but permits it to act when the circuit opens.

The stoker controls may be carried out by various means and circuits with thermostats at high voltage or low voltage and with either "open circuit" or "closed circuit" types of interceptors. When one or more thermostats or a thermostat and a "hold fire control" are used in conjunction with a limit control equipped with an interceptor, it is necessary that each control device which might stop the stoker be caused to stop it at the proper point.

In the drawings forming a part of this specification:

Figure 1 is a diagrammatic side view partly in section of a stoker stopped with the ram closing the throat, as controlled by my interceptor.

Figure 2 is a diagrammatic detail showing my interceptor means associated with a limit control of the character illustrated.

Figure 3 is a diagrammatic detail showing a portion of the interceptor shown in Figure 2 in a different position.

Figure 4 is a detail similar to Figure 3 showing the stopped position of the switch when the limit control has operated the mercury switch into open position.

Figure 5 shows a diagrammatic detail of another form of my interceptor as applied to a limit control of a different character, showing one position of the interceptor parts in dotted outline.

Figure 6 diagrammatically illustrates the wiring diagram of the "open circuit" type interceptor with a high voltage control circuit from the magnetic switch passing through the thermostat.

Figure 7 is a similar diagrammatically illustrated electric circuit showing a low coltage circuit from a transformer from the ram switch, thermostat, and interceptor and including an actuating relay in the control circuit of the magnetic switch.

Figure 8:
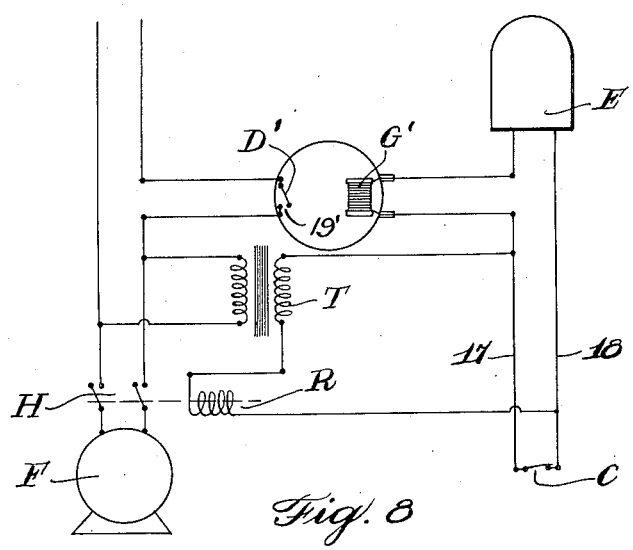

Figure 8 diagrammatically illustrates a circuit where the stoker is controlled by low voltage current from the ram switch, thermostat and interceptor.

Figure 9:
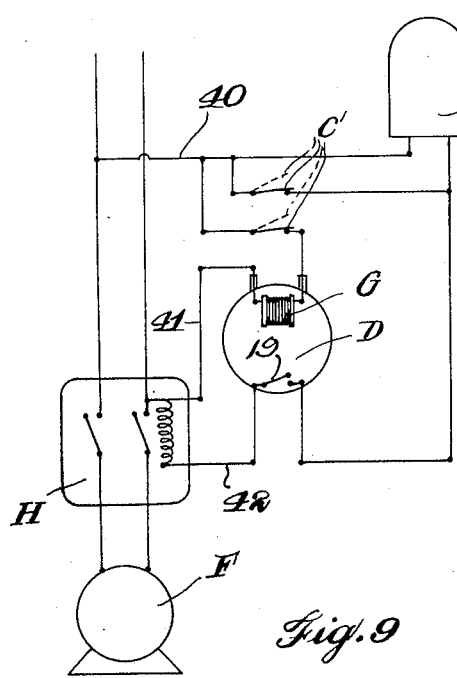

Figure 9 diagrammatically illustrates the controlling circuit for a stoker with high voltage control through the limit switch, ram switch, thermostat and interceptor and using a double pole ram switch.

Figure 10:
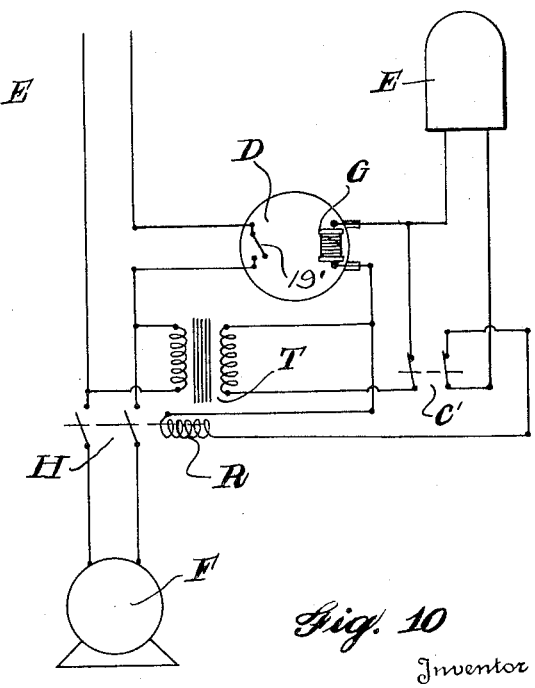

Figure 10 diagrammatically illustrates the controlling circuit for a stoker operated by a low voltage relay which performs the same functions in the same way with the double pole ram switch, as illustrated in Figure 9.

The drawings illustrate the stoker A connected to the furnace B with the throat 10 of the stoker extending through the side wall of the furnace, while the retort 11 is positioned in the bed portion of the furnace and the tuyères 12 of the fire box are positioned about the retort 11.

The stoker A is provided with a fuel ram or plunger 13 which is adapted to be operated by the cylinder 14 through connection by the piston rod 15 which connects the piston of the cylinder 14 with the ram 13. A switch C is associated with and adapted to be operated by the adjustable stop member 16 on the rod 15 to open the switch C when the ram 13 is in its forward position, extending in and closing the throat 10 of the stoker A when in this position. Electric wires 17 and 18 lead from the switch C and connect with the limit control D and the thermostat E as illustrated in Figures 6, 7, and 8. The cylinder 14 is adapted to be operated by a hydraulic control system which is not illustrated in the drawings, excepting for the electric motor which operates the pump of the hydraulic control. The motor F is illustrated diagrammatically in the drawings, showing the circuits for controlling the stoker A.

In the circuits illustrated in Figures 9 and 10, the switch C is of a double pole construction to control the circuits illustrated in the operation of the stoker ram, the detail and operation of which will be readily set forth.

Where the limit control D is of a construction such as that illustrated in Figure 2, which shows a diagrammatic back view of a form of limit control having a mercury tube switch 19 mounted upon the pivotal connection 20 supported by the frame 21, I provide an interceptor G. The interceptor G includes a solenoid 22 which is connected in the line to be energized during normal operation of the limit control D to cause the armature 23 of the same to be held in the position illustrated in Figure 2, which in turn holds the coil spring 24 in position to retard the movement of the switch 19 on its pivot 20. This is the normal position when the stoker A is running and the interceptor G is inoperative to cause the stoker to stop. The form of limit control illustrated in Figure 2 is one which may be operated by pressure from the furnace or boiler of the furnace to which the stoker A is connected, the control being connected by the threaded nipple 25 and when the pressure in the furnace B reaches the limit at which the limit control D is set to operate, the switch 19 would be ordinarily operated to tilt the tube of the switch 19 into the position illustrated in Figure 4. However, with my interceptor G, the switch 19 is retarded from being tilted into open position, owing to the action of the spring 24 which is held by the solenoid 22 in the position illustrated in Figure 2.

When the circuit is opened to the interceptor G, the armature 23 is urged by the coil spring 26 into the position illustrated in Figure 3, which moves the coil spring 24 in line with the pivot 20, thus overcoming the retarding action of the interceptor G on the switch 19 and leaving it free to be operated by the limit control mechanism in its ordinary manner. I have illustrated diagrammatically the movement of the switch tube 19 into open position of the limit control D after the interceptor has released the same and the limit control D is operated to move the switch tube 19 into position to open the circuit which controls the motor F.

The limit control D' may be in the form illustrated in Figure 5 wherein the motor controlling switch 19' is mounted slightly different than that illustrated in Figure 2, however, the principle is the same and in this construction, I provide the solenoid 22' which operates the armature 23'. This limit control is the "open circuit" type and is controlled by the interceptor G' which includes the solenoid 22' and the armature 23' with the operating spring 28. Normally the armature 23' is held by the coil spring 28 as in full line position, and is provided with a lever end 29 which bears against the end of the lever 30. The lever 30 is pivoted at 31 and the spring 32 of the limit control is assisted by the spring 28 to hold the arm 33 of the lever 30 in position to hold the brace bar 34 bearing against the end 35 of the operating lever 36 to hold the lever 36 locked against operation by the steam pressure on the rod 37, the pressure acting through the nipple 25 and also assisting the tension spring 38 in holding the arm 36 against operation. The arm 36 is fulcrumed at 39 and when the circuit is closed to operate the solenoid 22, the armature 23 is drawn into the dotted position, permitting the release of the lever 30 so that the lever 36 may be raised by the rod 37 into the dotted position, which moves the lever 30 into the dotted position through the bar 34. This operation will tilt the motor control switch 19' to open the circuit in the same and stop the motor. In this type of limit control, the interceptor G' is controlled by the switch C, the operation of which will be more fully hereinafter set forth.

In the use of the "open circuit" type of interceptor G', which is shown by the circuit in Figure 6 with a high voltage control circuit from the magnetic switch H, the current passes through the thermostat E, the ram switch C and through the limit control switch 19'. When the stoker A is operated with this circuit, the motor F will continue to run when the control circuit is closed through the limit control switch 19'. The ram switch C is normally closed and acts as a short circuit across the thermostat E and interceptor G', thus preventing any large amount of current from flowing through them, except when the ram switch is open, as illustrated in Figure 1 where the ram 13 is in its inner position. The solenoid 22 is so positioned as to prevent a small amount of current from holding the armature 23', so that the armature is released when the switch C is closed. In this circuit, the thermostat is open for hot and closed for cold. The interceptor G' is of the "open" type illustrated in Figure 5. With this operating circuit, should the limit control D' or the thermostat E be operated to act to stop the motor F at any time, they will not do so unless the switch C is open at the forward stroke of the ram 13. Either the limit control or the thermostat can operate to stop the motor F when the switch C is opened. When the opening of the switch C causes current to pass through the solenoid 22' of the interceptor G' the armature 23' will be pulled into dotted line position, permitting the limit control D' by pressure or heat to operate the switch 19'. The thermostat may stop the motor F when the ram switch C is open if the circuit in the thermostat is open without any action of the solenoid 22' of the interceptor G'.

In Figure 7, I have illustrated a low voltage circuit from a transformer T passing through the ram switch C, thermostat E and interceptor G' and actuating a relay R in a control circuit of the magnetic switch H. It will be apparent that otherwise the action is the same as in Figure 6 for controlling the stoker A.

In Figure 8 I have illustrated the relay R acting directly on the line, and controlled by low voltage current through the ram switch C, thermostat E and interceptor G'. The operation to control the stoker A is the same as in Figures 6 and 7, it being apparent that in either case whether the thermostat E acts to stop the motor F or the limit control switch D' acts to stop the same, the switch C must be open before the motor F can be stopped, thereby insuring the bringing of the stoker ram 13 into position to close the throat 10 of the stoker A.

I have shown in Figure 9, the "closed circuit" type of interceptor with high voltage control circuit through the limit control D, ram switch C, thermostat E and interceptor G. In this circuit, a limit control as illustrated and described in Figures 2, 3, and 4 is employed where the current passes through the solenoid 22 normally retarding the switch 19 from opening. It will also be noted that in this circuit, it is necessary to run three wires 40, 41, and 42 to the magnetic switch instead of two usually employed in the control circuit in order to provide a separate circuit through the interceptor. In this circuit the ram switch is a double pole switch C' controlling two separate circuits. One of the circuits is a parallel connection across the thermostat E which delays stopping due to the thermostatic control until the ram switch C opens. The other circuit is in the normally closed interceptor line and permits the limit control to function when it opens but restrains it at all other times.

In Figure 10 I have illustrated a low voltage control circuit wherein the relay R operates the magnetic switch H and the double pole ram switch C, together with the interceptor G are operated by the low voltage. The operation in this circuit is otherwise the same as that of Figure 9 in that the interceptor circuit G is closed, however, the limit control D is operated direct off of the line. In each of the above circuits the thermostat E used opens the circuit when satisfied, and closes the circuit when too cold.

In each of the circuits defined, as well as the limit control devices illustrated, the motor operation is intercepted so that it will not stop until the ram of the stoker A is in the desired position, such as is illustrated in Figure 1. By stopping the ram in this position, it closes the fuel throat 10, prevents any back draft or fire in the throat, while the stoker is stopped, and insures perfect control of the stoker at all times. The limit control, as well as the thermostat may be of any structure or design to place such safety means in the operation of the stoker as may be desired or required for the purpose of safety and for controlling the temperatures in buildings where the furnace is operated by a stoker. My interceptor does not impair or in any way decrease the efficiency of operation of either a thermostat or a limit control or of any other device applicable to control and operate a stoker, either of the type illustrated or such other type as may be desired, but provides a means of intercepting the stopping of the operation of the stoker so as to permit the same to be brought to rest at a predetermined point or time and thus provide a more efficient controlling means in the regulation of heat and steam pressure in buildings. The interceptor is very desirable to the ram type of stokers as it permits the ram to be always stopped at the right time. The delay of the control devices in operating to stop a stoker by my interceptor is only for a very short interval so that the efficiency of the stoker stopping or safety device is maintained in a better and more effective manner I believe, than has been accomplished heretofore. This is particularly true because with my interceptor, I am able to stop the stoker at the moment desired, thereby permitting the stoker to be more efficiently operated with greater safety and insuring control of the temperature or steam delivered by a boiler operated by a stoker under the influence of my interceptor and circuit controls.

I have defined my control with interceptor for stokers in accordance with the patent statutes, setting forth some of the outstanding limit controls associated with thermostats and operated with my interceptor to illustrate a manner in which the same may be carried out to control a stoker or the like and the invention should be defined within the scope of the following claims in applying the same to any device where it is applicable for similar purposes.

I claim:

1. An electrical interceptor for controlling the operation of a stoker fuel feeding means including, an electric solenoid having an armature, means for associating said solenoid with an electric switch in a limit control, whereby said solenoid will restrain the movement of said switch to open an electric circuit to stop the fuel feeding means of the stoker, and means for automatically relieving the restraining operation of said solenoid in relation to the switch to permit the switch to automatically stop the fuel feeding means of the stoker.

2. An electric interceptor adapted to be associated with limit and thermostatic controls for stokers including, an electrical means for applying restraining force to prevent the limit and thermostatic controls from operating to stop the fuel feeding means of a stoker, and means for automatically relieving said restraining force when a predetermined condition takes place in the stoker and permitting the limit and thermostatic controls to stop the fuel feeding to the stoker when the restraining force is relieved.

3. An electric circuit for operating an electric motor, an electric motor connected to said circuit, a magnetic switch from an electric feeding line adapted to operate said motor, an electric limit control switch connected to said magnetic switch adapted to be operated by pressure to open and close the same, an electric thermostat control connected to said magnetic switch operable by the temperature to open and close the same, a ram switch, an electric interceptor in said circuit adapted to restrain the opening operation of said switch in said limit control, and making the switch in the thermostatic control ineffective until said ram switch is opened.

4. An electric controlling circuit for electric motors including, an electric limit control switch adapted to be opened and closed by a predetermined pressure, an electric thermostat switch adapted to be opened and closed by a predetermined temperature, an electric interceptor associated with said limit control switch and said thermostat switch, an interceptor switch, circuit means for connecting said limit control switch, thermostatic switch, interceptor, and interceptor switch with a motor controlling switch and electric feeding line, and an electric motor controlled by said circuit and controls, whereby said limit and thermostatic control switches are ineffective to stop said motor until said interceptor switch is opened.

HAROLD S. MORTON.